Jillson & Sparhawk
Weaving Bag.
No. 13,848. Patented Nov. 27, 1855.
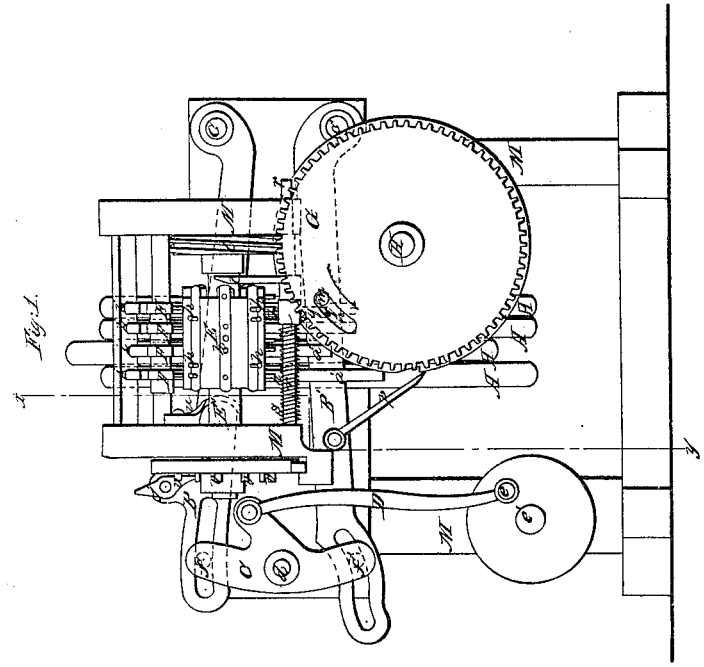
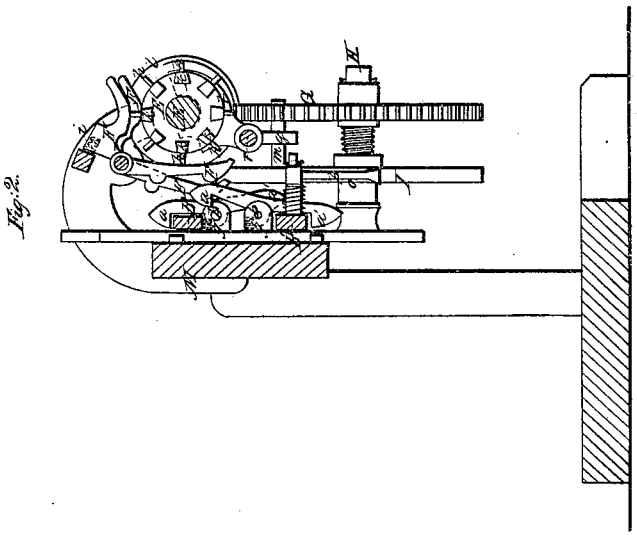

UNITED STATES PATENT OFFICE.

L. B. JILLSON AND G. SPARHAWK, OF LEWISTON, MAINE.

BAG-LOOM.

Specification of Letters Patent No. 13,848, dated November 27, 1855.

*To all whom it may concern:*

Be it known that we, L. B. JILLSON and GEORGE SPARHAWK, of Lewiston, in the county of Androscoggin and State of Maine, have invented certain new and useful Improvements in Looms for Weaving Seamless Bags; and we do hereby declare that the following is a full, clear, and exact description of the same, reference being had to the accompanying drawings, forming part of this specification, in which—

Figure 1, is an elevation of the mechanism by which the harness is operated; and Fig. 2, is a section of the same, in the line *x, y,* of Fig. 1.

Similar letters of reference indicate corresponding parts in both figures.

This invention consists in certain means of changing the harness motion from weaving the sides of the bag to weave the bottom, and vice versa.

To enable those skilled in the art to make and use our invention, we will proceed to describe its construction and operation.

The harness motion represented is only intended for weaving plain bags and only capable of operating four leaves of harness, the said leaves being intended to be connected each to one of the four upright rods A, A, A, A, which work in suitable guides, the said rods being provided each with a double hook lever *a, a',* pivoted to it by a pivot *b,* the said hooks being for the purpose of connecting the said rods with one of two levers B, B', which work on pivots *c c',* and receive a movement to and from each other in an upward and downward direction, for every stroke of the loom, through the agency of a lever C, which receives a vibrating motion on a pivot *d,* from a rod D, attached to a wrist *e,* which is attached to a shaft *e',* which receives one revolution for every stroke of the loom; the connection of the said lever C, with the levers B, B', being by pins *f, f',* attached to the former working in slots in the latter. The lever B, is for the purpose of raising and the lever B', for depressing the harness. The connection of the several rods A, A, A, A, with the lever B or B', is regulated by a studded pattern cylinder E acting through four bent levers F, F, F, F, on the double hook levers *a, a'.* Every time the front or upper end of one of these levers F, is thrown up by one of the studs *h, h,* on the cylinder, the lower end is thrown out from its respective hook lever as is the case with the foremost of the levers F, and hook levers *a, a',* shown in Fig. 2, and the upper end of the hook lever is thrown forward by a spring *g,* applied above its pivot *b,* throwing the upper hook *a,* to a position in which it will clear the lever B, and throwing the lower hook, *a',* into a position to be caught by the lever B', so that the leaf of harness with which it is connected will be depressed by the next movement of the lever B'. But when a space on the cylinder comes opposite the bearing point of either of the levers F, the said lever is pushed down in contact with it by a spring *i,* which is stronger than the spring *g,* and the lower end of the lever is pushed back against the hook lever *a, a',* pushing back the upper hook *a,* thereof to a position to be caught by the lever B, in its next ascent and throwing the hook *a',* clear of the lever B'. The last named condition of the hook F, and the lever hook *a, a',* is illustrated by the hindmost of the hooks visible in Fig. 2.

The cylinder E, is attached to a shaft E', which receives one eighth of a revolution at every beat of the loom through the agency of a spring pawl *j,* attached to the lever B, acting on one of eight equidistant pins *v, v,* on the face of a disk $E^2$, on the said shaft. The cylinder contains eight rows of studs *h, h,* arranged parallel with its axis each row being in a separate movable slide *k,* which is dovetailed or otherwise secured in the cylinder to keep it in place, but is capable of a limited longitudinal movement. The arrangement of the studs in these slides is such that the slides when at the end of their longitudinal movement in one direction will present opposite to the levers F, F, F, F, a proper pattern to weave the sides or open part of the bag, and when at the other end of their movement, a pattern to weave the bottom of the bag. This arrangement of studs needs not to be described, as it constitutes no part of the invention and will be understood by any weaver or other person versed in the construction of looms. In Fig. 1, the slides are supposed to be moved to the right hand and in condition for weaving the open part of the bag. The change of position is effected by the following means, and in the following manner.

The shaft E', of the cylinder E, carries an endless screw *l,* which gears with a worm wheel G, which turns loosely on a fixed axle H. This worm wheel has such a number of teeth that it makes one revolution during the weaving of a bag. On the same shaft is a circular disk I, which has a notch o, at one point of its periphery and which carries a pin m, entering a slot n, in the worm wheel G, and by this means the disk is caused to rotate with the worm wheel in the direction of the arrow shown in Fig. 1, until by the time the sides of the bag are woven to a sufficient length the notch o arrives at a position to receive the point of a spring pawl p, which is attached to the lever B', and which is always in contact with the periphery of the disk. By this time, the pin m, has arrived in contact with a finger q, attached to a rod r, which slides in suitable guides below and parallel with the cylinder E, and carries a fork t, which stands up opposite the right hand end of the cylinder and covers the ends of four of the slides. This rod has a spring s, applied to it in such a manner as to push it to the right hand and to hold the fork t, clear of the slides k, k, of the cylinder when they are in the position shown in Fig. 1, except when the rod is under other influence sufficiently powerful to overcome the spring. After the pawl p, has entered the notch o, the next descent of the lever B', causes the said pawl to move the disk, independently of the worm wheel far enough for the pin m, acting on the finger q, to drive the rod r, far enough to the left hand for the fork t, to shift the position of the four slides k, k, which happen to be opposite to it, to be in readiness to regulate the opening of the shed to weave the bottom of the bag, when they are severally brought into their operative position by the revolution of the cylinder. After passing their operative positions the slides are severally shifted back again to the right hand to the position shown in Fig. 2, by coming in contact with a stationary inclined piece u, secured to the framing M, M. Half a revolution of the cylinder completes the weaving of the bottom. It should have been before mentioned that the pin m, after having shifted the sliding rod r, and effected the change of position of the slides immediately passes the finger q and allows the sliding rod and fork to be forced back to the right by the spring s.

This invention is applicable to the weaving of twilled bags as well as plain. For twilled bags the number of slides k, k, will be increased to twelve and the number of harnesses to six, the length of the cylinder being properly increased to work six levers F, and hook levers a, a'.

We do not confine ourselves to the particular mechanism by which the rising and falling movement for the purpose of opening and closing the shed is effected; what we consider to be the important feature of our invention being applicable to many other lifting arrangements for opening and closing the shed. But

What we claim as our invention, and desire to secure by Letters Patent, is—

1. Placing the two sets of studs of the pattern cylinder, for weaving the sides and bottom of the bag, in slides k, k, fitted to the cylinder to slide longitudinally thereto, substantially as herein described, so as to admit of the changing of the harness motion from weaving the sides to weave the bottom of the bag, or vice versa, by shifting the whole or any number of the said slides according to the number of picks desired in the bottom.

2. The combination of the sliding rod r, having a fork t, and finger q, with the notched disk I, carrying the pin m, the pawl p, or its equivalent, the worm wheel G, and the endless screw l, on the cylinder, all operating substantially as herein described for the purpose of shifting the slides in the cylinder to change the operation of the harness.

L. B. JILLSON.
GEO. SPARHAWK.

Witnesses:
C. W. GODDARD,
R. G. BARRELL.